(12) United States Patent
Zhou et al.

(10) Patent No.: US 12,228,717 B2
(45) Date of Patent: Feb. 18, 2025

(54) MICROSPHERE HOLDER

(71) Applicant: PHAOS TECHNOLOGY PTE. LTD., Singapore (SG)

(72) Inventors: Yan Zhou, Singapore (SG); Lianwei Chen, Singapore (SG); Minghui Hong, Singapore (SG)

(73) Assignee: PHAOS TECHNOLOGY PTE. LTD., Singapore (SG)

( * ) Notice: Subject to any disclaimer, the term of this patent is extended or adjusted under 35 U.S.C. 154(b) by 685 days.

(21) Appl. No.: 17/602,038

(22) PCT Filed: Apr. 20, 2020

(86) PCT No.: PCT/SG2020/050244
§ 371 (c)(1),
(2) Date: Oct. 7, 2021

(87) PCT Pub. No.: WO2020/218972
PCT Pub. Date: Oct. 29, 2020

(65) Prior Publication Data
US 2022/0179184 A1  Jun. 9, 2022

(30) Foreign Application Priority Data
Apr. 26, 2019 (SG) .............................. 10201903778S

(51) Int. Cl.
*G02B 7/02* (2021.01)
*G02B 21/02* (2006.01)

(52) U.S. Cl.
CPC ............. *G02B 21/02* (2013.01); *G02B 7/027* (2013.01)

(58) Field of Classification Search
CPC .......... G02B 21/02; G02B 7/02; G02B 7/027; G02B 21/24; G02B 27/58
See application file for complete search history.

(56) References Cited

FOREIGN PATENT DOCUMENTS

| CN | 1731230 | 2/2006 | |
|---|---|---|---|
| CN | 1867844 | 11/2006 | |
| CN | 105840649 A | 8/2016 | |
| CN | 205581379 U | 9/2016 | |
| CN | 205787247 U | 12/2016 | |
| CN | 107402443 | * 11/2017 | ............. G02B 27/58 |

(Continued)

OTHER PUBLICATIONS

English translation of Chinese Search Report from corresponding Chinese Application No. 202080029874.3.

(Continued)

*Primary Examiner* — Joseph P Martinez
(74) *Attorney, Agent, or Firm* — Grogan, Tuccillo & Vanderleeden LLP

(57) ABSTRACT

A holder for a microsphere comprises a first body portion and a second body portion coupled to the first body portion. The first body portion and the second body portion being configured to provide a receiving position therebetween for the microsphere, such that when the microsphere is at the receiving position, the microsphere is coupled to the first body portion and the second body portion. In another aspect, a lens system for near-field optics is disclosed. An optical microscope comprising the holder or the lens system is also disclosed. A microsphere assembly being attachable to an objective lens for near field optics is also disclosed.

18 Claims, 13 Drawing Sheets

(56) References Cited

FOREIGN PATENT DOCUMENTS

| | | |
|---|---|---|
| CN | 107402443 A | 11/2017 |
| CN | 108351501 | 7/2018 |
| JP | 2006326716 A | 12/2006 |
| WO | 2017034484 A1 | 3/2017 |

OTHER PUBLICATIONS

English translation of Chinese Office Action from corresponding Chinese Application No. 202080029874.3.

* cited by examiner

MICROSPHERE HOLDER

CROSS REFERENCE TO RELATED APPLICATION

This application is a national stage application of PCT/SG2020/050244 filed Apr. 20, 2020, which claims priority of Singapore Patent Application No. 10201903778S, filed on Apr. 26, 2019, all of which are hereby incorporated by reference in their entirety.

TECHNICAL FIELD

Disclosed herein relates to the field of optical imaging apparatus, in particular a device for optical microsphere nanoscopy.

BACKGROUND

Achievable image resolution under visible or white light illumination, with the aid of a conventional optical microscope, is limited by the diffraction limit. Attempts to overcome the diffraction limit include submerging the sample in a liquid, and depositing microspheres directly onto the sample, creating a set-up where the microspheres are in contact with the sample (what is referred to as "contact" nanoscopy). Observation of 50 nm feature size has been demonstrated. Super resolution down to 23 nanometers (nm) is achievable under controlled conditions. Film-based methods and tip-based methods are proposed for applications where it is not desirable to have the microspheres contact the sample. These are just as difficult to implement outside a controlled environment or outside a laboratory for various reasons, such as the fragility of a tip-based set-up. Understandably, film-based (membrane-based) set-ups are just as challenging, facing issues with image aberrations or images having very low contrasts as a result of the membrane on which the microspheres are deposited.

Owing to these and other challenges, optical microscope nanoscopy largely remains as an essentially laboratory-based technique even to this day. Yet, there are a broad range of applications which can benefit if optical microsphere nanoscopes can be robust, portable, and operable on objects or samples found in ambient air conditions, using visible light illumination. Some examples of industrial applications include precision manufacturing, semiconductor manufacturing and integrated circuit chip production, inspection of large-scale aerospace structures on-site for enhanced quality control, etc.

SUMMARY

In the present disclosure, according to an aspect, a holder for a microsphere is presented. The holder includes a first body portion and a second body portion coupled to the first body portion, the first body portion and the second body portion being configured to provide a receiving position therebetween for the microsphere, such that when the microsphere is at the receiving position, the microsphere is coupled to the first body portion and the second body portion.

Additionally, the microsphere is coupled to the first body portion at a first coupling portion and the microsphere is coupled to the second body portion at a second coupling portion, and wherein the first coupling portion is distinct from the second coupling portion. As an option, the first body portion and the second body portion are configured to at least clasp the microsphere at the receiving position.

In another embodiment, the first body portion and the second body portion are configured to provide a plurality of selectable positions such that the receiving position is one selected from any of the plurality of selectable positions. Optionally, the first body portion and the second body portion are spaced apart to define respective sides of a slot, the slot substantially extending along a first axis, and wherein the plurality of selectable positions is distributed along the first axis. Additionally, the first body portion and the second body portion are spaced apart by a spacing, the spacing having at least two different widths along the first axis. Optionally, the first body portion and the second body portion are non-parallel relative to one another.

In yet another embodiment, the first body portion defines a first distal surface substantially in a first plane, and the second body portion defines a second distal surface substantially in a second plane, and wherein the first plane and the second plane are non-coplanar. Optionally, the first distal surface and the second distal surface define a reflex angle therebetween. As an option, the holder can be made from an opaque, translucent, or transparent material.

As another aspect of the disclosure, a lens system for near-field optics is presented. The lens system includes an objective lens; a holder coupled to the objective lens, the holder having a first body portion and a second body portion configured to provide a receiving position; and a microsphere at the receiving position, the microsphere being coupled to the first body portion and the second portion.

Optionally, the microsphere is coupled to the first body portion at a first coupling portion and the microsphere is coupled to the second body portion at a second coupling portion, and wherein the first coupling portion is distinct from the second coupling portion. Additionally, the first body portion and the second body portion are configured to at least clasp the microsphere.

In an embodiment, the first body portion defines a first distal surface substantially in a first plane, and the second body portion defines a second distal surface substantially in a second plane, and wherein the first plane and the second plane are non-coplanar. Additionally, the first distal surface and the second distal surface define a reflex angle therebetween.

In an embodiment, the holder has reflection symmetry about a center plane, the center plane being defined by a center of the microsphere and an intersection line, the intersection line being an intersect of the first plane and the second plane.

The present disclosure also includes an optical microscope comprising the holder as recited above.

As another aspect of the disclosure, a microsphere assembly, the microsphere assembly being attachable to an objective lens for near field optics, the microsphere assembly made by a process comprising bending a sheet from a first state to a second state, the sheet having a first body portion and a second body portion spaced apart to define respective coupling sides of a slot, the slot providing at least one receiving position for receiving a microsphere such that the microsphere is couplable to the first body portion and the second body portion at the respective coupling sides, wherein the bending makes the first body portion and the second body portion non co-planar relative to one another.

Further, the sheet in the second state is configured to clasp the microsphere between the respective coupling sides. Optionally, the coupling sides are non-parallel relative to one another when the sheet is in the second state, and wherein the coupling sides are substantially parallel to one another when the sheet is in the first state. As an option, the microsphere is further fixed to the respective coupling sides by an adhesive.

DETAILED DESCRIPTION

Figure 1:
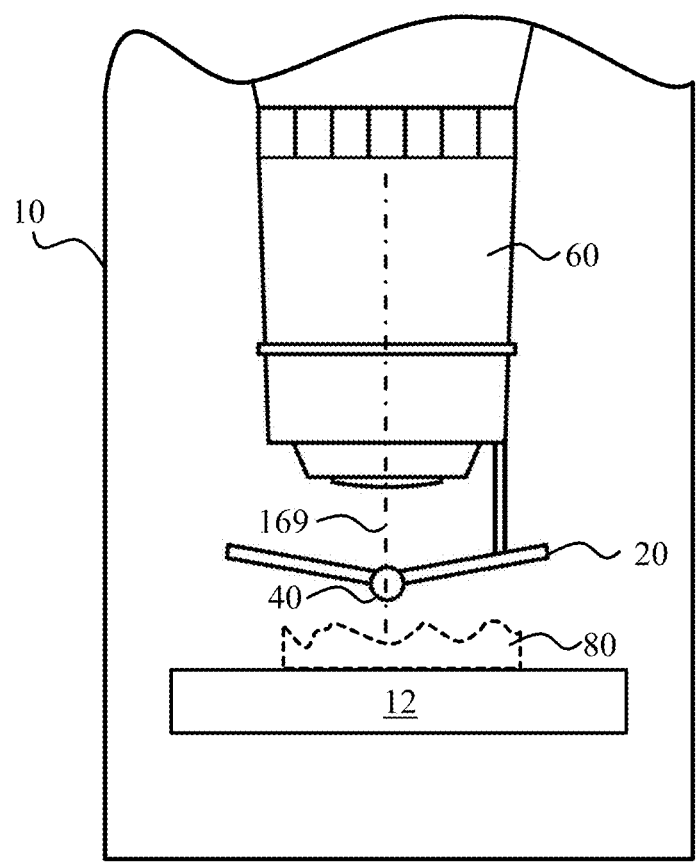
FIG. 1 is a schematic diagram of an apparatus, including a lens system, for optical microsphere nanoscopy according to an embodiment of the present disclosure.

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, some or all known structures, materials, or operations may not be shown or described in detail to avoid obfuscation.

As used herein, the singular "a" and "an" may be construed as including the plural "one or more" unless clearly indicated otherwise.

There are many uses for improved optical microsphere nanoscopy, and especially for apparatus operable using visible or white light illumination. Even more desirable would be optical microsphere nanoscopy that can be performed with the sample being disposed in ambient air. It will be appreciated that such improved optical microsphere nanoscopy opens the way to safer and more portable apparatus, and thus increasing the range of applications where nanoimaging can be used. Indeed, while equipment such as scanning electron microscopes (SEM) and transmission electron microscopes (TEM) are available, it must be conceded that these are not exactly suitable for use outside specially built facilities. Other microscopy techniques, such as scanning near-field microscopy (SNOM), stimulated emission depletion (STED) microscopy, and photoactivatable localization microscopy (PALM), etc., too, have their uses. It is known that such microscopy techniques can be so invasive or require sample preparation techniques that contaminate the sample or affect the viability of live subjects. In contrast, embodiments of the present disclosure provide an improvement by enabling non-contact nanoscopy that overcomes the diffraction limit of visible or white light, even with the sample being disposed in ambient air without special sample preparation. This is extremely beneficial in many fields, including high-speed optical characterization of viruses, integrated circuit failure analyses, and the development of nanotechnologies. "Non-contact" (or "non-invasive") as used in this document refers to the imaging or inspection of a sample without any lens coming into contact with the sample, without the need to submerge the sample in some liquid to aid image capture, and/or without damaging or changing the nature or a property of the object for the sake of imaging. "Imaging", "observing", "detection", and "inspection" are used interchangeably as the context will make clear, for the sake of brevity.

FIG. 1 is a partial schematic diagram of a device for optical microsphere nanoscopy according to an embodiment of the present disclosure. An objective lens 60 (such as that of the optical microscope 10) is coupled with a microsphere holder 20. The microsphere holder 20 is coupled to an optical microsphere 40. The optical microscope 10 is suitable for acquiring images of an object or feature of a sample 80 (hereinafter referred to interchangeably as an object or sample for the sake of brevity). The sample 80 is shown here as being provided on a stage 12 of the microscope 10 as a non-limiting example. In some applications, the stage is not required, for example, when the optical microsphere nanoscope is configured for on-site inspection of a large-scale structure, such as an aircraft body, a ship hull, or a building structure, etc. The microscope 10 includes a lens system according to an embodiment of the present disclosure. As part of the lens system, the microsphere 40 and the microsphere holder 20 are disposed between the objective lens 60 and the sample 80 such that a high resolution image of the sample 80 can be captured by the objective lens 60 with the aid of the microsphere 40. The microsphere holder 20 is configured to fix the microsphere at a predetermined location, such as at a point along the optical axis 169 of the objective lens. A source of illumination, such as a source of visible light, may be provided so that light reflected off the sample enters the objective lens. Alternatively, or additionally, a source of illumination, such as a source of visible light, may be provided so that light transmitted through the sample enters the objective lens. For the sake of brevity, "visible light" refers to light that includes at least one wavelength within the visible spectrum. The microsphere holder 20 may be used with or implemented as part of an optical microscope so that super resolution beyond the diffraction limit is achievable. In this document, super resolution imaging, near-field imaging, and nanoscopy are used interchangeably to refer to the observation, imaging, or inspection at a level of resolution beyond the diffraction limit of visible or white light. In one aspect, embodiments of the present disclosure provide an apparatus for improved optical microsphere nanoscopy (OMN).

Figure 2:
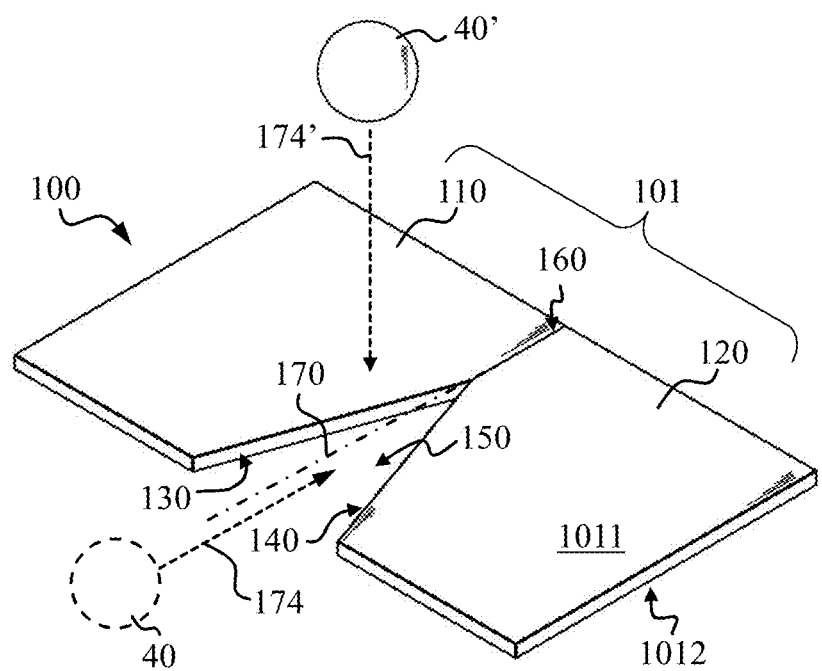
FIG. 2 is an isometric view of a microsphere holder and a microsphere according to an embodiment of the present disclosure.

One embodiment of the microsphere holder is described with reference to FIG. 2 and FIG. 3. The microsphere holder 100 is configured to be coupled to a microsphere 40/40' and an optical microscope 10 for non-contact optical microsphere nanoscopy. The microsphere holder 100 includes a body 101 having a first body portion 110 and a second body portion 120 coupled to the first body portion 110. The first body portion 110 and the second body portion 120 may be directly joined where they meet 160. Alternatively, a connecting portion 160 may be disposed between the first body portion 110 and the second body portion 120. The first body portion 110 and the second body portion 120 are configured to provide a receiving position therebetween for the microsphere 40, such that when the microsphere 40 is at the receiving position, the microsphere 40 is coupled to the first body portion 110 and the second body portion 120. The first body portion 110 has a first coupling portion 130 and the second body portion 120 has a second coupling portion 140. In the example shown, the first coupling portion 130 is one side of first body portion 110, and the second coupling portion 140 is a side of the second body portion facing or opposing the first coupling portion 130. Thus, in assembly, the microsphere 40 is coupled to the first body portion 110 at the first coupling portion 130 and the microsphere 40 is coupled to the second body portion 120 at the second coupling portion 140, with the first coupling portion 130 being distinct from the second coupling portion 140.

As illustrated, a slot 150 may be open-ended to facilitate receiving a microsphere 40 from a first approach 174, where the first approach 174 is substantially parallel to the first axis 170. The microsphere 40' may alternatively be received by another approach 174', where the second approach 174' is angularly displaced relative to the first approach 174.

The first body portion 110 and the second body portion 120 are spaced apart by a spacing that has at least two different widths along the first axis 170. Optionally, the first body portion 110 and the second body portion 120 are non-parallel relative to one another. The slot 150 may be configured as a notch formed on the body 101, with the first coupling portion and the second coupling portion being inclined as two sides of a triangle. In some embodiments, the first coupling portion 130 and the second coupling portion 140 each forms at least one side of a polygonal profile, in which the first coupling portion 130 and the second coupling portion 130 are each part of respective sides of the polygonal profile, the respective sides being optionally adjacent to each other or not adjacent to each other. Optionally, the slot 150 may be configured with a curvilinear profile, that is, having at least one curved section. In another embodiment, the slot 150 is configured as a cutout formed in a unitary body 101. Optionally, the cutout may be configured as a polygonal cutout (such as triangular, rectangular, diamond shaped, etc.) or it may be configured as a curvilinear cutout.

The first coupling portion 130 and second coupling portion 140 are configured to contact the microsphere 40 at respective distinctive parts on the surface of the microsphere, to hold the microsphere 40 in a fixed position relative to the microsphere holder 100. In this embodiment, the first body portion 110 and the second body portion 120 are configured to at least clasp the microsphere 40 at the receiving position. In other words, the first body portion 110 and the second body portion 120 are configured to act as a pair of clamps or jaws, holding or clamping the microsphere in a firm clasp. Forces are applied on the microsphere at two or more distinct locations (also referred to herein as "microsphere locations") such that the microsphere is securely coupled to the holder 100, and thereby also coupled to the optical microscope. That is to say, a clamping force on the microsphere 40 holds the microsphere 40 in a predetermined position, fixed relative to the microsphere holder 100. Optionally, an adhesive may be provided between the microsphere 40 and the first and second coupling portions 130/140.

Figure 3:
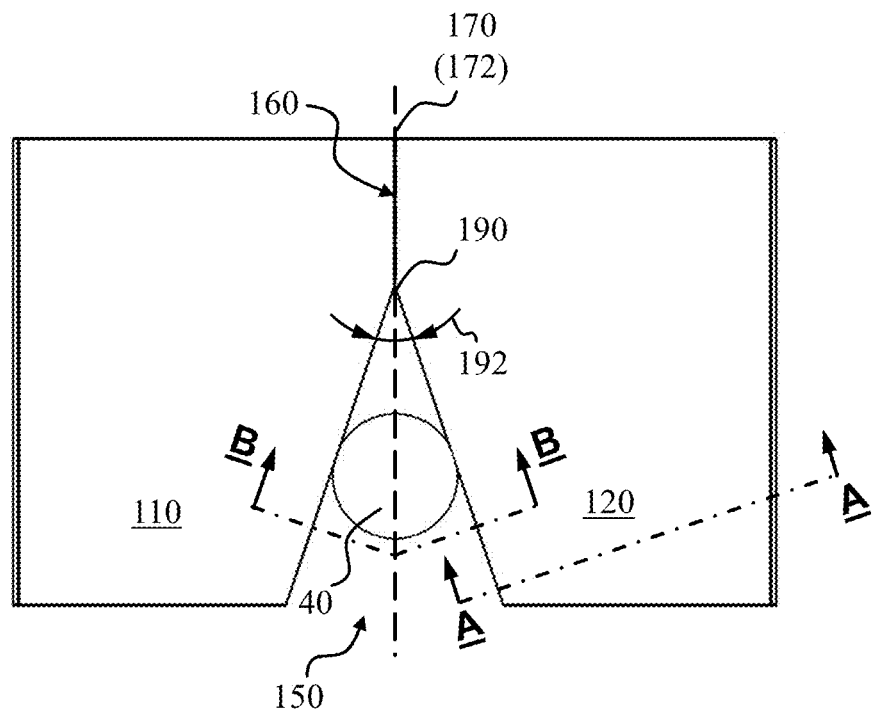
FIG. 3 is a top view of the microsphere holder according to the embodiment as shown in FIG. 2.
Figure 4:
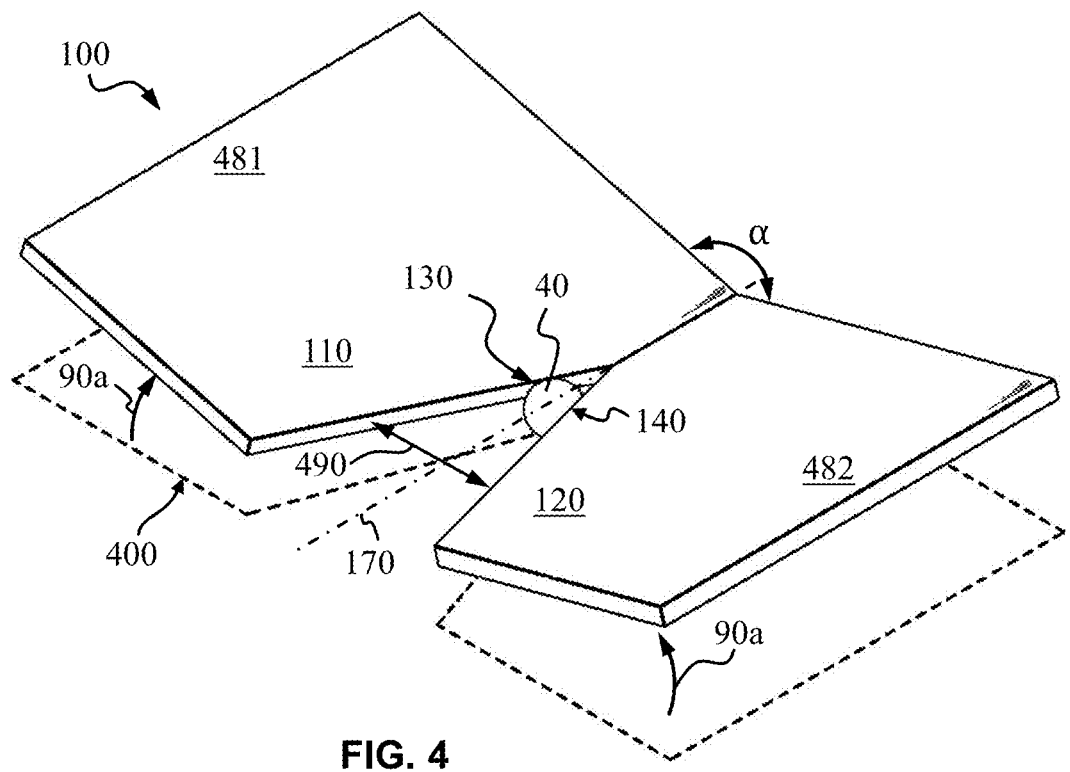
FIG. 4 is an isometric view of a microsphere holder and a microsphere according to another embodiment.
Figure 5:
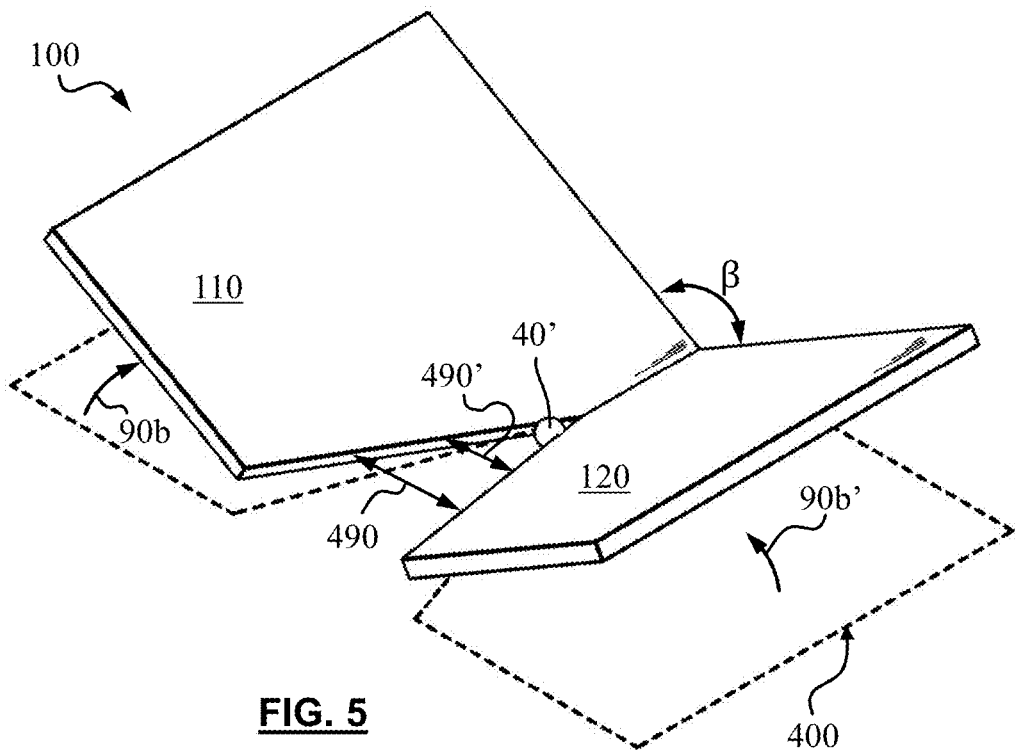
FIG. 5 is an isometric view of the microsphere holder according to another embodiment.
Figure 6:
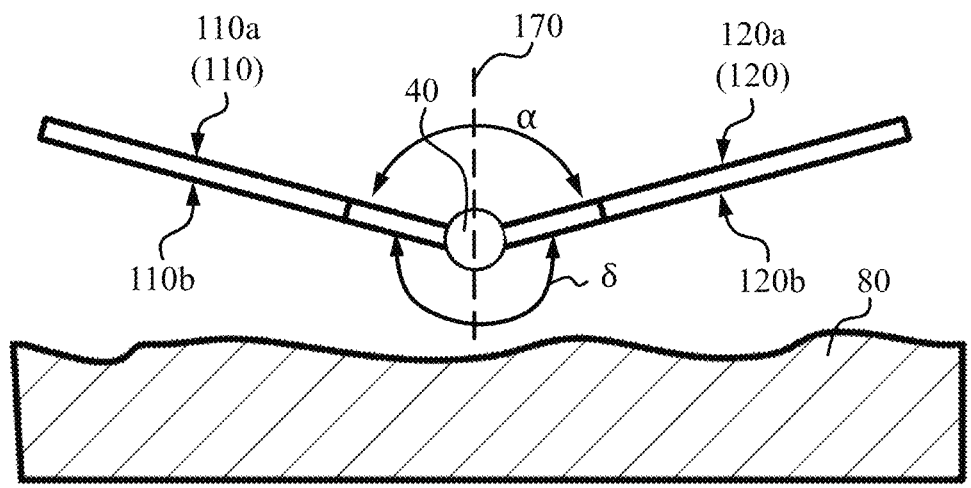
FIG. 6 is a front view of the microsphere holder of FIG. 4.
Figure 7:
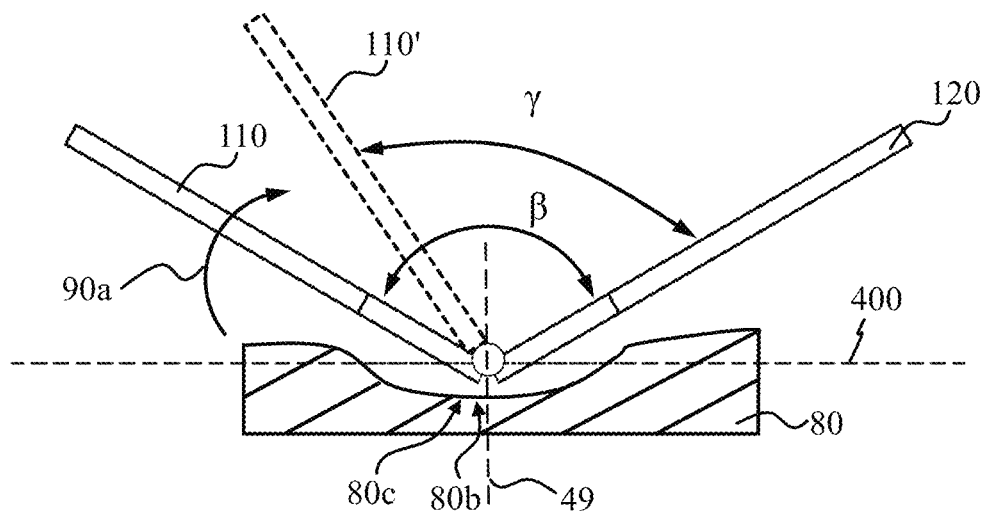
FIG. 7 is a front view of the microsphere holder of FIG. 5.

Optionally, as shown in FIG. 3, the connecting portion 160 defines a center plane 172, and the slot 150 is symmetrical about the center plane 172. Alternatively, the slot 150 is not symmetrical about the center plane 172. Each of the first body portion 110 and the second body portion is substantially planar with a proximal face 1011 and a distal face 1012. In assembly, the proximal face 1011 faces the objective lens 60 and the distal face 1012 faces away from the objective lens 60.

Referring now to FIGS. 4 to 7, the holder 100 is configured to form an angle α between the first body portion 110 and the second body portion 120, in which the angle α is not 180 degrees. In this configuration, the first body portion 110 and the second body portion 120 are non-parallel relative to one another. The first body portion 110 defines a first distal surface 110b substantially in a first plane, and the second body portion 120 defines a second distal surface 120b substantially in a second plane, and wherein the first plane and the second plane are non-coplanar. The first distal surface 110b of the first body portion 110 is angularly displaced from a reference plane 400. The second distal surface 120b of the second body portion 120 is angularly displaced from the reference plane 400. The first distal surface 110b and the second distal surface 120b define a reflex angle δ therebetween, hence angle δ is in the range of 180° to 360°. The first distal surface 110b and the second distal surface 120b defining a "v-shape" or a valley.

The first body portion 110 and the second body portion 120 are spaced apart to receive the microsphere 40 at a receiving position. The slot 150 is defined by the first body portion and the second body portion such that the slot 150 substantially extends along a first axis 170, providing a plurality of selectable positions that are distributed along the first axis 170. The first body portion and the second body portion are configured to provide a plurality of selectable positions such that the receiving position is one selected from any of the plurality of selectable positions. The first body portion and the second body portion are spaced apart by a spacing 490, the spacing having at least two different widths 490, 490' along the first axis 170. The slot 150 can thus simultaneously hold microspheres of different sizes at different receiving positions along the first axis 170. The spacing or width of the slot 150 can be varied by varying the angle between the first body portion 110 and the second body portion 120. As shown, the spacing 490 is smaller or narrower when the angle β is smaller than α. It can be appreciated that the holder 100 can be configured to secure microspheres of different sizes at the same receiving position.

The first and second body portions 110/120 may be folded or bent by rotating respective far ends 481, 482 in directions 90b, 90b' (clockwise and anti-clockwise) about the first axis 170. This may simultaneously contribute to the clamping force on the microsphere. In one aspect, the clamping force(s) contributing to securely couple the microsphere to the holder (and hence the optical microscope) also contributes to the formation of a narrower slot 150 such that an angle β forms between the first body portion 110 and the second body portion 120, with the angle being smaller than the angle α. This allows for a microsphere 40 of a different size to be used with the same microsphere holder 100 at one of the selectable positions. Alternatively, the narrower slot 150 allows adjustment of the selectable position of the microsphere 40 along the optical axis of the objective, allowing for adjustment of the position of the microsphere 40 relative to the sample 80. This also allows the microsphere 40 to be positioned close to the region of interest 80b without the microsphere holder 100 contacting the sample 80, thus allowing a non-contact or non-intrusive, non-destructive imaging method. In other words, the microsphere 40 may be brought even closer to the sample 80 with less risk of disturbing or contacting the sample 80.

Further, the first and second body portions 110/120 may be configured closer together, such as forming an angle γ between the first body portion 110 and the second body portion 120, where the angle γ is smaller than the angle α or the angle β. This allows the microsphere 40 to be positioned closer to the region of interest 80c without the microsphere holder 100 contacting the sample 80, thus allowing greater proximity between the microsphere and the sample and at the same time providing a greater clearance between the microsphere holder (the first and second distal surfaces) and the sample. The first body portion and the second body portion may each be configured at a different angular displacement from the reference plane 400 such that, in use, the microsphere holder may be asymmetrical about an optical axis of the objective lens. The microsphere holder 400 therefore provides greater flexibility for adapting to different situations, including situations where a more robust imaging apparatus is desirable and the feature to be observed or detected is on a sample with steep topology.

Figure 8:
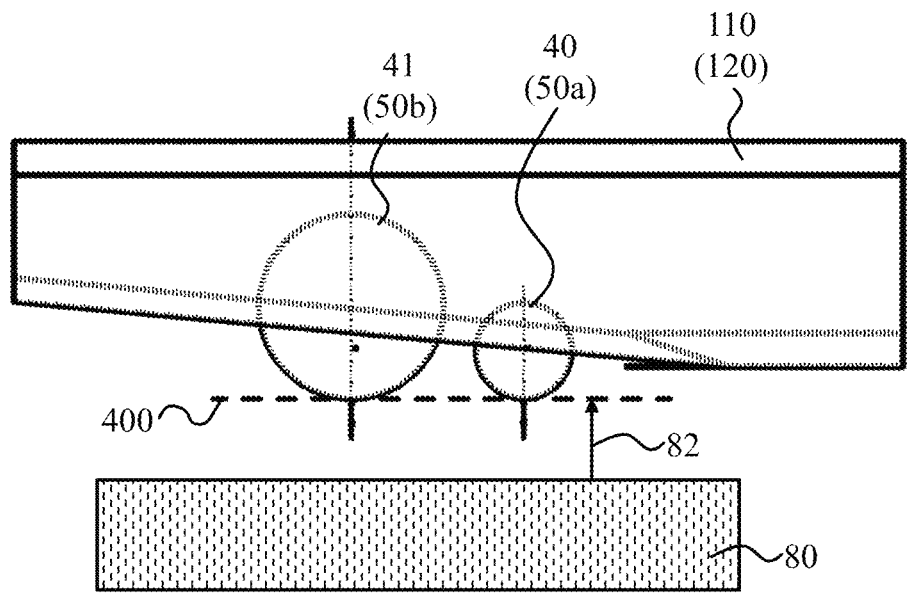
FIG. 8 is a side view of the microsphere holder showing different selectable positions for differently-sized microspheres.
Figure 9:
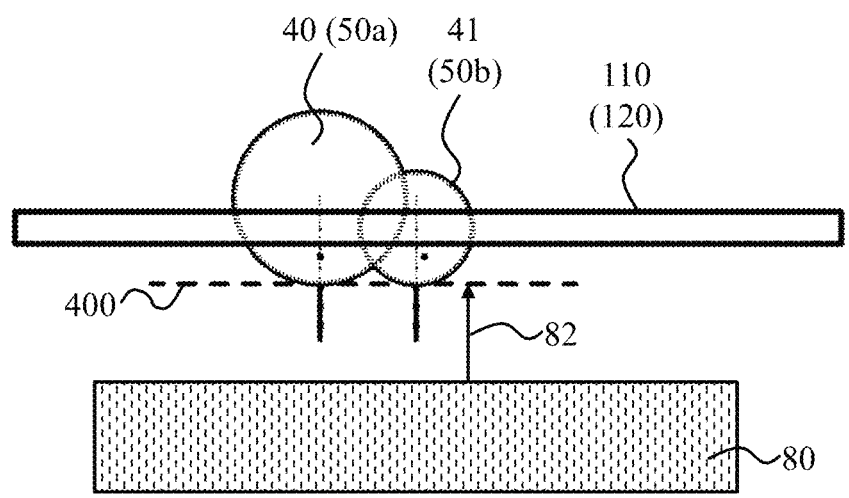
FIG. 9 is a side view of the microsphere holder showing different selectable positions for differently-sized microspheres according to another embodiment.
Figure 10:
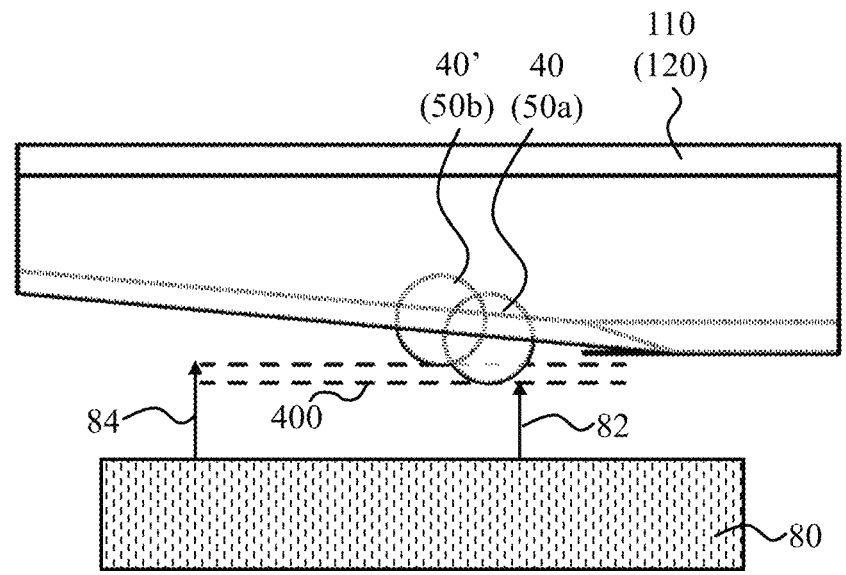
FIG. 10 is a side view of the microsphere holder showing different selectable positions for similarly-sized microspheres.
Figure 11:
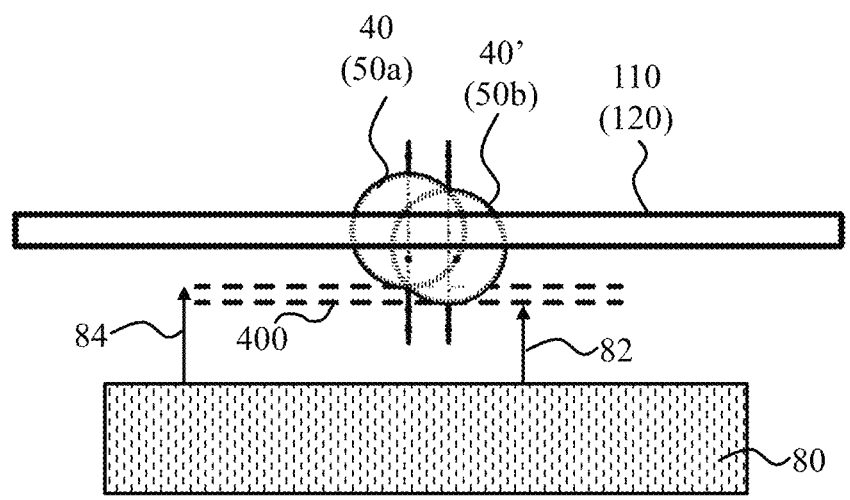
FIG. 11 is a side view of the microsphere holder showing different selectable positions for similarly-sized microspheres according to another embodiment.

FIG. 8 illustrates the provision of a plurality of selectable positions 50a/50b distributed along the first axis, such that the receiving position may be one selected from any of the plurality of selectable positions 50a/50b. Microspheres 40/41 of differing sizes may be disposed in the plurality of selectable positions 50a/50b such that the distances 82 between the reference plane 400 and the microspheres 40/41 are substantially the same while the first and second coupling portions are inclined relative to the reference plane 400. FIG. 9 shows the microspheres 40, 41 similarly disposed at substantially the same distance from the reference plane 400, where the first and second coupling portions are substantially parallel to the reference plane 400. In another example, as shown in FIG. 10, the microspheres 40/40' of the same size may be disposed in the plurality of selectable positions 50a/50b such that each microsphere 40/40' is held at a different distance 82/84 from the reference plane 400, and with the first and second coupling portions inclined relative to the reference plane 400. In the example of FIG. 11, the microspheres 40, 40' are held at different distances from the reference plane 400, while the first and second coupling portions are oriented substantially parallel to the reference plane 400. Thus, one slot (or opening) can be flexibly adapted to accommodate microspheres of different diameters.

Figure 12:
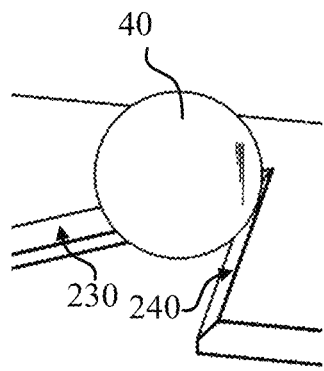
FIG. 12 is an isometric view of a microsphere holder and a microsphere according to another embodiment.
Figure 13:
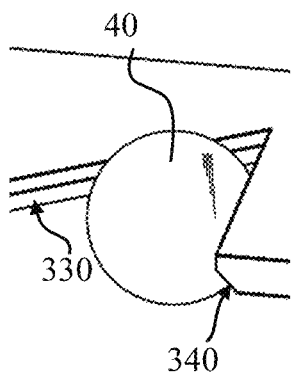
FIG. 13 is an isometric view of a microsphere holder and a microsphere according to a further embodiment.

Edges of the slot 150 may be provided with chamfers 230, 240 (FIG. 12) adjacent the proximal surface and/or chamfers 330, 340 (FIG. 13) adjacent the distal surface. The chamfers are configured to contact the microsphere 40 at two or more distinct microsphere locations. Contact between the chamfers and the microsphere locations may be point contacts. Alternatively, the chamfers may be configured to conform to a curvature of the microsphere 40 such that the contact between each chamfer and the microsphere 40 may be a line contact.

Figure 14:
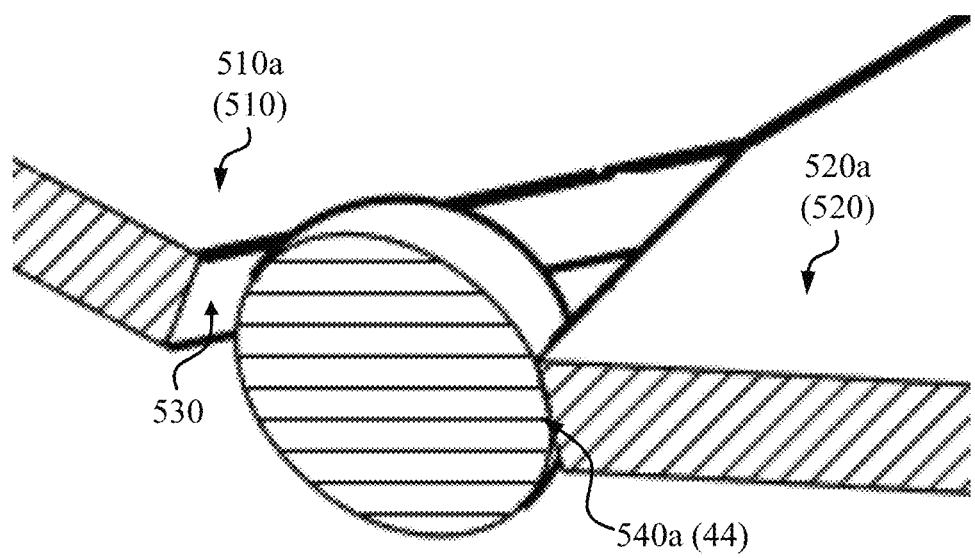
FIG. 14 is a magnified sectional view of part of the microsphere holder with a microsphere.

Referring to FIG. 14 which shows a cross-section of a microsphere in assembly with a microsphere holder, first and second coupling portions 530/540 are configured as surfaces 530a/540a disposed between respective distal surfaces 510b/520b and proximal surfaces 510a/510b of the first and second body portions 510/520. The respective surfaces 530a/540a are configured to contact the microsphere 40 at distinctive first microsphere location 43 and second microsphere location 44.

Figure 15:
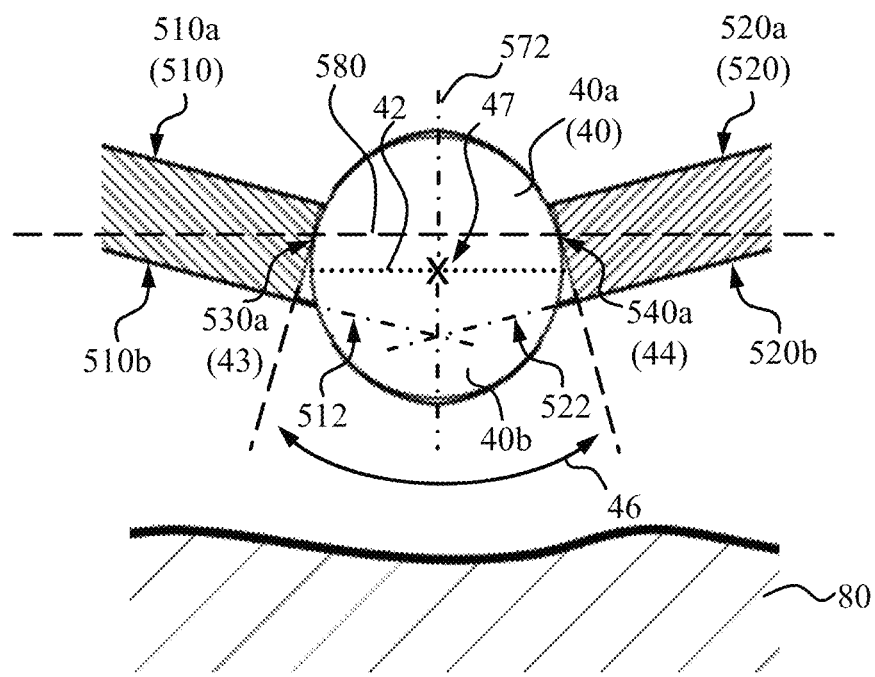
FIG. 15 is a sectional view of the microsphere holder according to view D-D.

Referring to FIG. 15, the microsphere locations 43/44 define a contact plane 580 which is parallel to a microsphere section plane 42 which passes through a center of the microsphere 40. As an example, the surfaces 530a/540a of the slot are tilted relative to the contact plane 580. Alternatively, the surfaces 530a/540a of the slot are perpendicular to the contact plane 580. The contact plane 580 divides the microsphere 40 into a first microsphere portion 40a and a second microsphere portion 40b, wherein the first microsphere portion 40a is smaller than the second microsphere portion 40b. In this embodiment, the microsphere 40 protrudes from the slot 550, wherein the microsphere 40 is in closer proximity to the sample 80 in comparison to the distal surfaces 510b/520b, thus allowing a larger field of view 46 of the virtual image. In other words, the microsphere can be mounted on the holder in a way that it is mechanically clasped by the first and second coupling portion, with the lower surface of the microsphere well below the distal surface of the holder.

Figure 16:
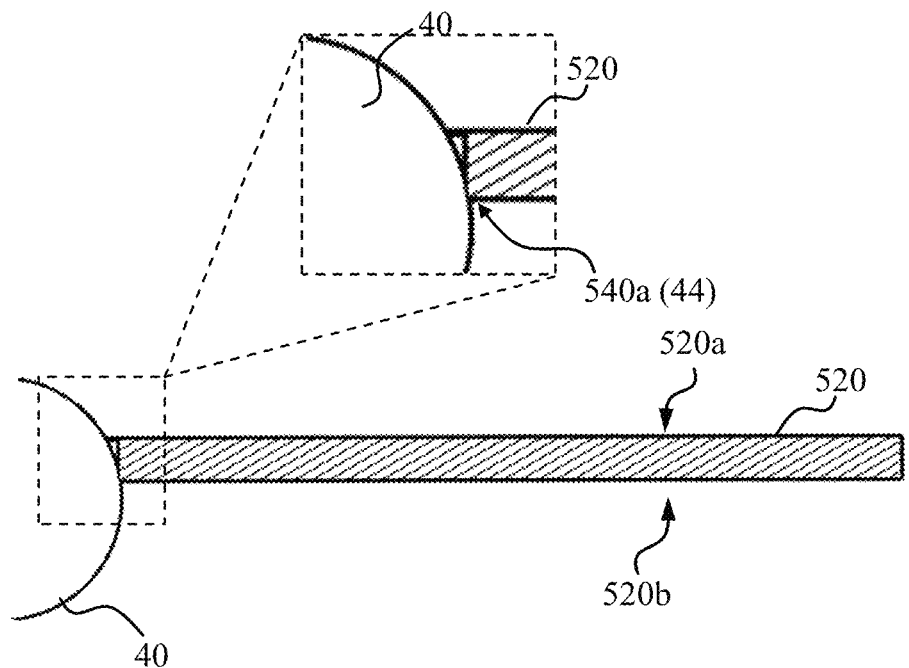
FIG. 16 is a magnified partial sectional view showing the microsphere-microsphere holder assembly according to view A-A.
Figure 17:
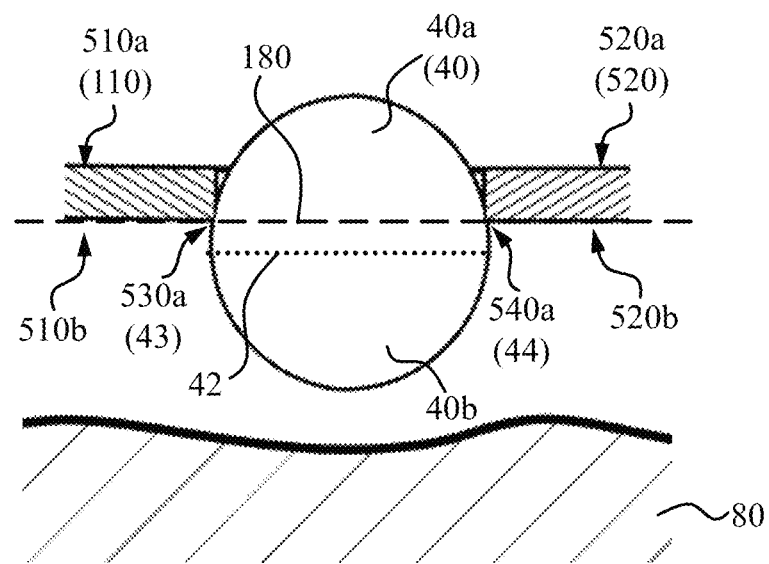
FIG. 17 is a close up partial sectional view of a microsphere in assembly with a microsphere holder at section B-B.

Referring now to FIG. 16 and FIG. 17, which are enlarged sectional views, the first and second body portions 510/520 are both configured in a planar form, and the first body portion 510 is configured to be coplanar with the second body portion 520. The first body portion 510 includes a first proximal surface 510a and a first distal surface 510b, similarly, the second body portion 520 includes a second proximal surface 520a and a second distal surface 520b. The first body portion 510 defines the first distal surface 510b substantially in a first plane, and the second body portion 520 defines a second distal surface 520b substantially in a second plane, wherein the first plane and the second plane are coplanar. In this embodiment, the coupling portions 530/540 are configured as an edge 530a/540a of respective distal surfaces 510b/520b of body portions 510/520. The respective edges 530a/540a are configured to contact the microsphere 40 at distinctive first microsphere location 43 and second microsphere location 44. In this embodiment, the contact between the edges 530a/540a and the microsphere locations 43/44 may be point contacts. Alternatively, the edges 130a/140a may be configured to conform to a curvature of the microsphere 40 such that the contacts between the edges 530a/540a and the microsphere locations 43/44 are line contacts.

Further referring to FIG. 17, the microsphere locations 43/44 define a contact plane 180 which is parallel to a microsphere section plane 42 which passes through a center of the microsphere 40. The contact plane 180 divides the microsphere 40 into a first microsphere portion 40a and a second microsphere portion 40b, wherein the first microsphere portion 40a is smaller than the second microsphere portion 40b. In this embodiment, the microsphere 40 protrudes from the slot 150, wherein the microsphere 40 is in closer proximity to the sample 80 in comparison to the distal surfaces 510b/520b, thus allowing a larger field of view of the virtual image.

Figure 18:
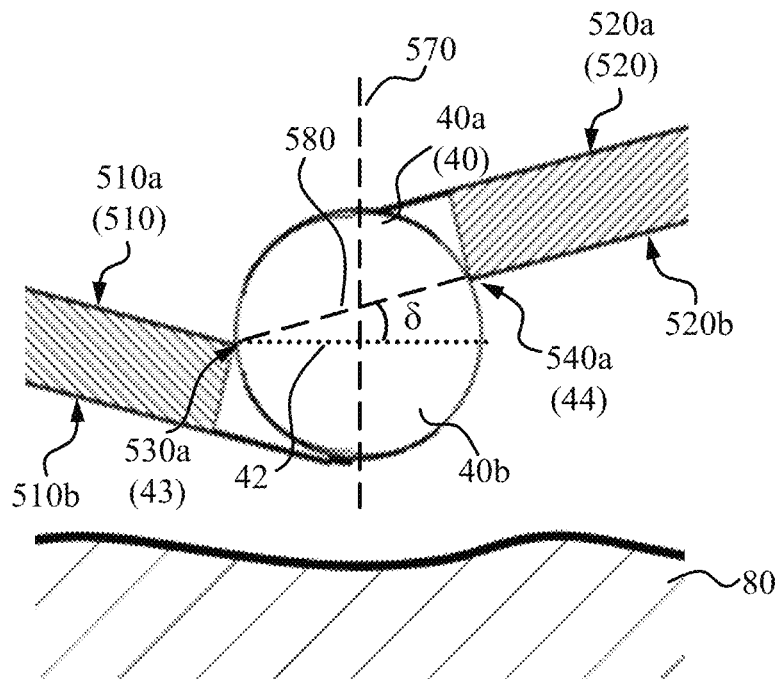
FIG. 18 illustrates how the microsphere is coupled to the microsphere holder according to one embodiment.

In another embodiment, as illustrated in FIG. 18, the coupling portions 530/540 are configured as edges 530a/540a, the edge 530a of the first proximal surface 510a, and the edge 540b of the second distal surface 520b. The slot 450 is thus not symmetrical about the center plane 572. The respective edges 530a/540a are configured to contact the microsphere 40 at distinctive first microsphere location 43 and second microsphere location 44. In this embodiment, the contacts between the edges 530a/540a and the microsphere locations 43/44 are point contacts. The microsphere locations 43/44 define a contact plane 580 which forms an angle δ to a microsphere section plane 42 which passes through a center of the microsphere 40. The contact plane 580 divides the microsphere 40 into a first microsphere portion 40a and a second microsphere portion 40b, wherein the first microsphere portion 40a is smaller than the second microsphere portion 40b. In this embodiment, the microsphere 40 is in closer proximity to the sample 80 in comparison to the distal surfaces 510b/520b. Alternatively, the contact plane 580 divides the microsphere 40 into a first microsphere portion 40a and a second microsphere portion 40b such that the first microsphere portion 40a is equal to the second microsphere portion 40b.

Figure 19:
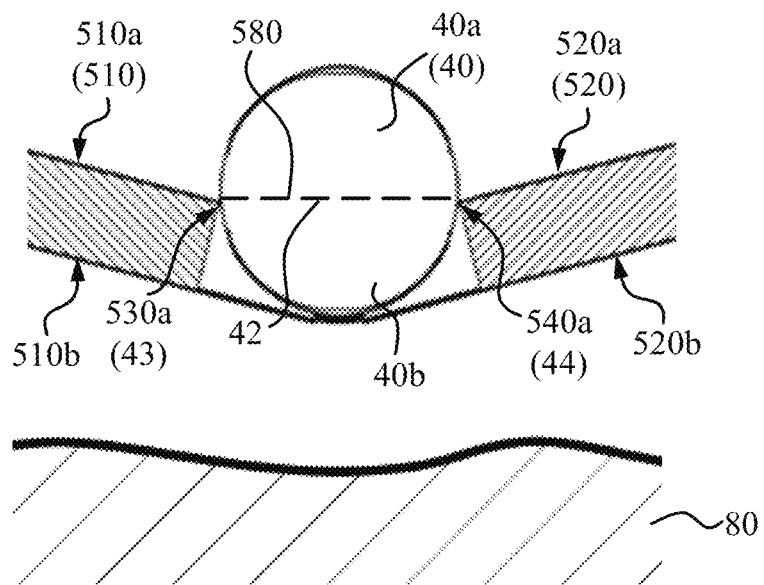
FIG. 19 illustrates how the microsphere is coupled to the microsphere holder according to another embodiment.

In another embodiment illustrated in FIG. 19, the coupling portions 530/540 are configured as edges 530a/540a of respective proximal surfaces 510a/520a. The respective edges 530a/540a are configured to contact the microsphere 40 at distinctive first microsphere location 43 and second microsphere location 44. In this embodiment, the contacts between the edges 530a/540a and the microsphere locations 43/44 are point contacts. The microsphere locations 43/44 define a contact plane 580 which is coplanar with a microsphere section plane 42 which passes through a center of the microsphere 40. The contact plane 580 divides the microsphere 40 into a first microsphere portion 40a and a second microsphere portion 40b, wherein the first microsphere portion 40a is equal to the second microsphere portion 40b. In this embodiment, the microsphere 40 is in equal proximity to the sample 80 in comparison to the distal surfaces 510b/520b.

Figure 20:
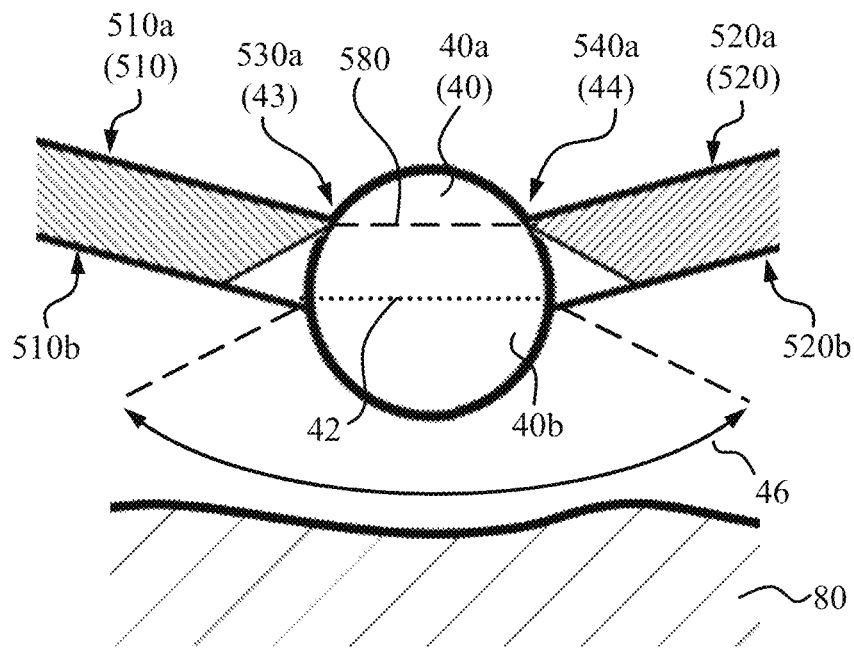
FIG. 20 illustrates how the microsphere is coupled to the microsphere holder according to yet another embodiment.

In another embodiment illustrated in FIG. 20, the coupling portions 530/540 are configured as tip edges 530a/540a formed on respective proximal surfaces 510a/520a. The respective tip edges 530a/540a are configured to contact the microsphere 40 at distinctive first microsphere location 43 and second microsphere location 44. In this embodiment, the contacts between the tip edges 530a/540a and the microsphere locations 43/44 are point contacts. The microsphere locations 43/44 define a contact plane 580 which is parallel to a microsphere section plane 42 which passes through a center of the microsphere 40. The contact plane 580 divides the microsphere 40 into a first microsphere portion 40a and a second microsphere portion 40b, wherein the first microsphere portion 40a is significantly smaller than the second microsphere portion 40b. The microsphere 40 protrudes from the slot, wherein the microsphere 40 is in closer proximity to the sample 80 in comparison to the distal surfaces 510b/520b, thus allowing a larger field of view 46 of the virtual image.

Figure 21:
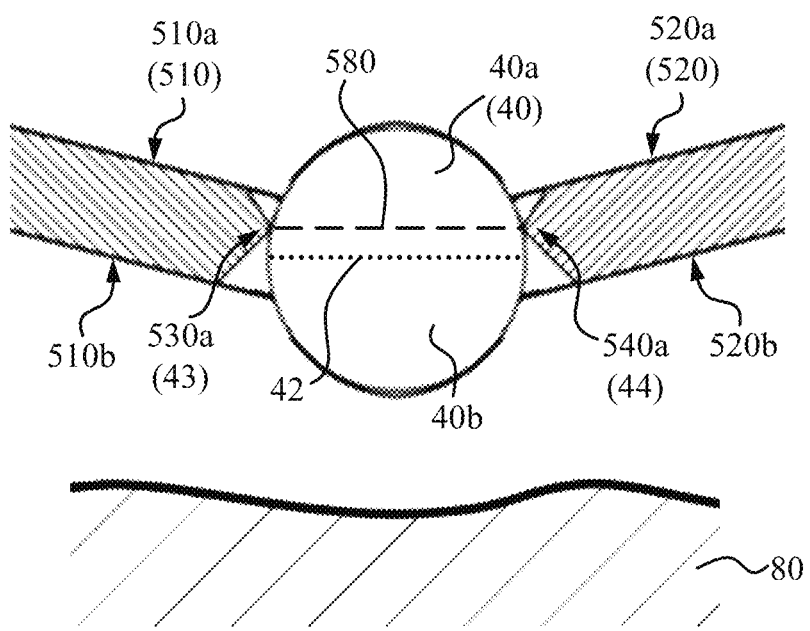
FIG. 21 illustrates how the microsphere is coupled to the microsphere holder according to another embodiment.

In another embodiment illustrated in FIG. 21, the coupling portions 530/540 are configured as chamfer edges 530a/540a of chamfer surfaces formed on respective proximal surfaces 510a/520a and distal surfaces 510b/520b. The respective chamfer edges 530a/540a are configured to contact the microsphere 40 at distinctive first microsphere location 43 and second microsphere location 44. In this embodiment, the contacts between the chamfer edges 530a/540a and the microsphere locations 43/44 are point contacts. The microsphere locations 43/44 define a contact plane 580 which is parallel to a microsphere section plane 42 which passes through a center of the microsphere 40. Alternatively, the contact plane 580 may be configured to be coplanar with the microsphere section plane 42.

Figure 22:
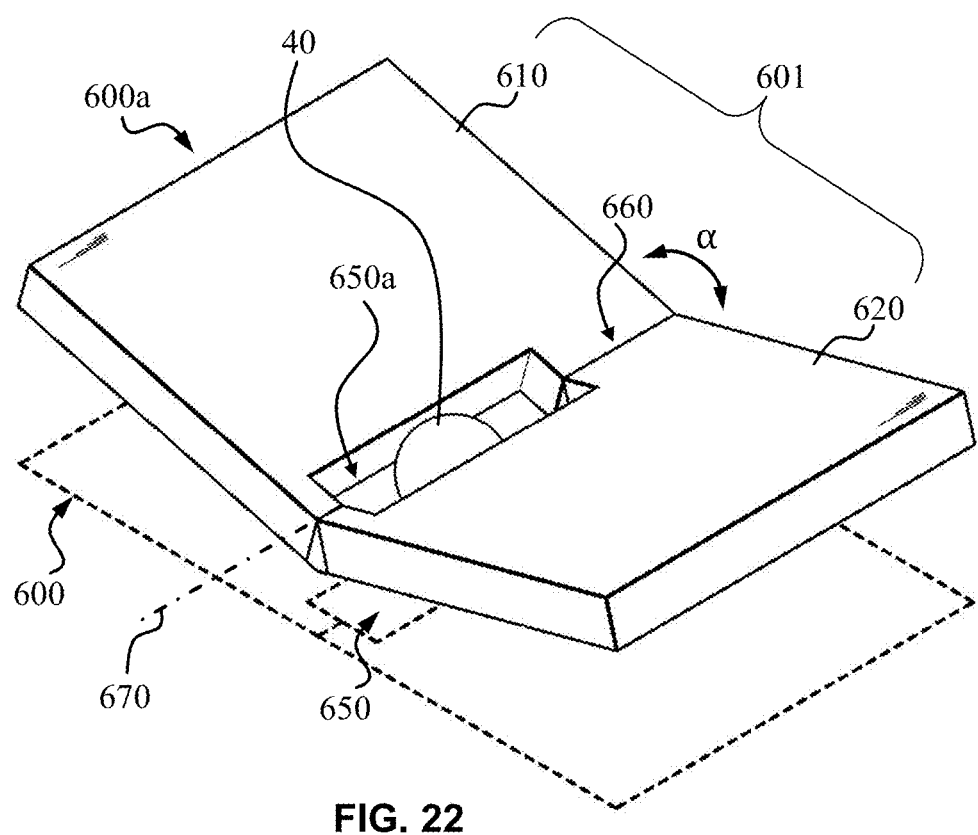
FIG. 22 is an isometric view of a microsphere holder and a microsphere according to another embodiment.

FIG. 22 illustrates an embodiment of a microsphere holder 600 and a microsphere 40 coupled to the microsphere holder 600 for non-contact optical microsphere nanoscopy. The microsphere holder 600 includes a body 601 having a first body portion 610 and a second body portion 620 coupled to the first body portion 610. A connecting portion 660 is disposed between the first body portion 610 and the second body portion 620. The first body portion 610 and the second body portion 620 are configured to provide a receiving position therebetween for the microsphere 40, such that when the microsphere 40 is at the receiving position, the microsphere 40 is coupled to the first body portion 610 and the second body portion 620. The first body portion 610 has a first coupling portion 630 and the second body portion 620 has a second coupling portion 640. The microsphere 40 is coupled to the first body portion 610 at the first coupling portion 630 and the microsphere 40 is coupled to the second body portion 620 at the second coupling portion 640, wherein the first coupling portion 630 is distinct from the second coupling portion 640. The first body portion 610 and the second body portion 620 are spaced apart to define respective sides of a slot 650, the slot 650 substantially extending along a first axis 670, and wherein a plurality of selectable positions is distributed along the first axis 670. The first body portion 610 and the second body portion 620 are spaced apart by a constant spacing. The body portions 610/620 form an angle α about the connecting portion 760.

The slot 650 is configured as a cutout formed on the body 601. The cutout 650 may be configured as a polygonal cutout (such as triangular, rectangular, diamond shaped, etc) or may be configured as a curvilinear cutout. In this embodiment, the slot 650 is configured as a rectangular cutout.

Further, the body portions 610/620 are being configured to bend about the connecting portion 660 to form an angle α between the first body portion 610 and the second body portion 620, resulting in a narrowed cutout 650*a* and the microsphere holder 600*a* in a bent state. In this state, a clamping force is introduced by the coupling portions 630/640 acting upon the microsphere 40, to hold the microsphere 40 relative to the microsphere holder 600*a*. Optionally, an adhesive may be provided between the microsphere 40 and the coupling portions 630/640 to hold the microsphere 40 in a fixed position relative to the microsphere holder 600*a*.

Figure 23:
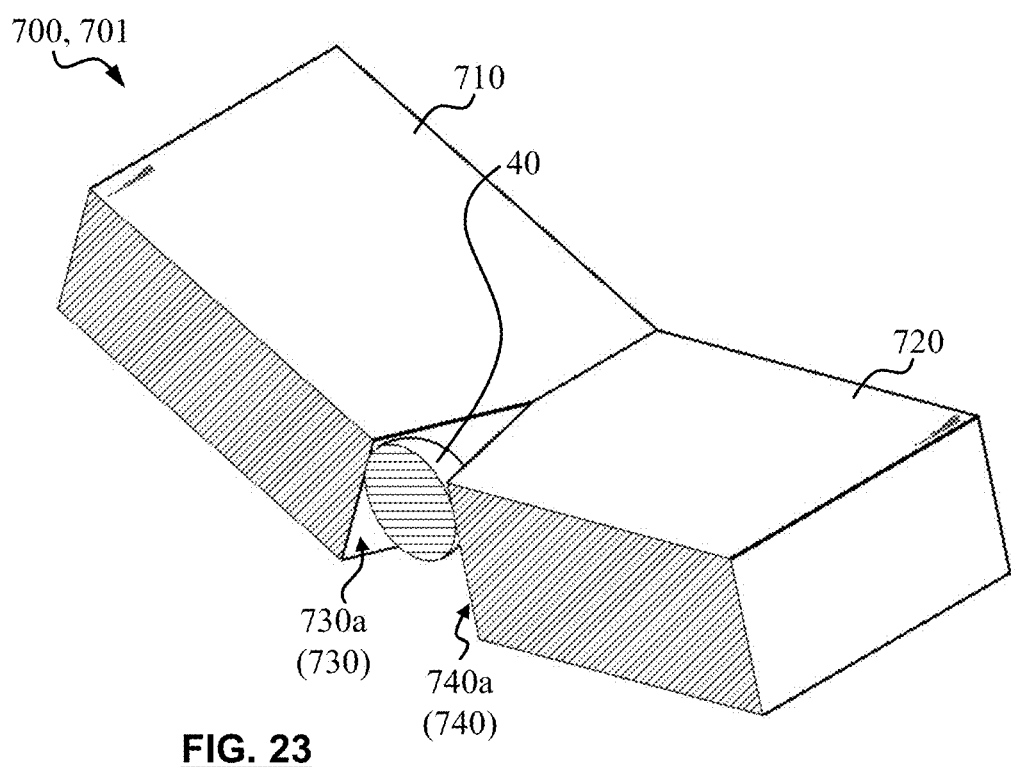
FIG. 23 is a sectional view of the microsphere holder according to view E-E.

FIG. 23 illustrates an embodiment of a microsphere holder 700 and a microsphere 40 coupled thereto. The microsphere holder 700 has a body 701 including a first body portion 710 and a second body portion 720 coupled to the first body portion 710. The first body portion 710 and the second body portion 720 are configured to provide a receiving position therebetween for the microsphere 40, such that when the microsphere 40 is at the receiving position, the microsphere 40 is coupled to the first body portion 710 and the second body portion 720. The first body portion 710 has a first coupling portion 730 and the second body portion 720 has a second coupling portion 70. The microsphere 40 is coupled to the first body portion 710 at the first coupling portion 730 and the microsphere 40 is coupled to the second body portion 720 at the second coupling portion 740, wherein the first coupling portion 730 is distinct from the second coupling portion 740. The first body portion 710 and the second body portion 720 are configured to at least clasp the microsphere 40 at the receiving position by applying a clamping force, introduced by the coupling surfaces 730*a*/740*a* to act on the microsphere 40, to hold the microsphere 40 in the receiving position, fixed relative to the microsphere holder 700. Optionally, an adhesive may be provided between the microsphere 40 and the coupling surfaces 730*a*/740*a*. As illustrated, in some embodiments, the body 701 may be thicker than the diameter than the microsphere 40.

As an example, the body 101/501/601/701 is made from metal, such as a metallic sheet. Alternatively, the body may be made from one or more materials selected from various materials such as polymers, composites, Polyethylene terephthalate (PET), etc. The dimensions of the microsphere holder, such as a thickness of the first body portion and the second body portion respectively, may be selected with reference to the microsphere 40. To illustrate, in some embodiments, the body has a thickness about half of a diameter of the selected microsphere. In some embodiments, the body has a thickness approximately equal to a diameter of the microsphere. In some other embodiments, the body has a thickness approximately twice of a diameter of the microsphere. To further illustrate, in some embodiments, the body has a thickness in the range of between a quarter to thrice of a diameter of the microsphere. In other embodiments, the body has a thickness in the range of between half to twice of a diameter of the microsphere. The dimensions and materials of the microsphere holder are selected to provide sufficient stiffness/elasticity in its respective parts, and mechanical integrity, to clasp and support the microsphere at an intended position. Further, the thickness may be selected to allow sufficient mechanical damping in the body. The thickness of the first and second body portions are selected to reliably support the microsphere, while its configuration and shape minimizes or avoids significant reduction in the effective illumination, enabling the objective lens to collect enough light signals for effective nano-imaging.

Figure 24:
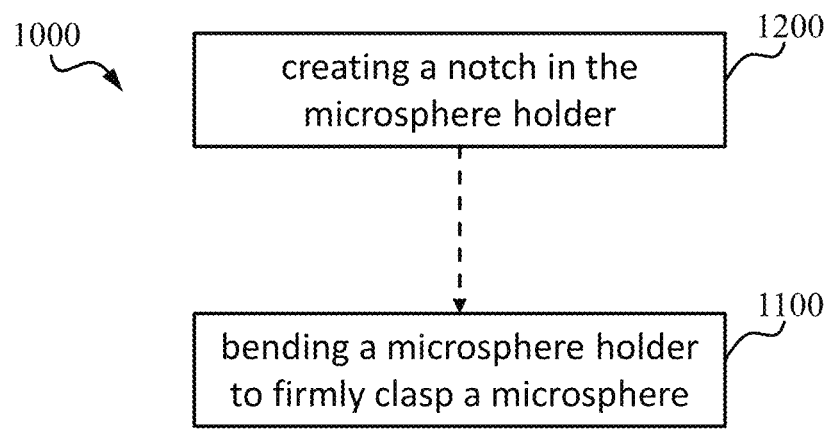
FIG. 24 is a schematic flowchart of a method of making a microsphere holder.

As illustrated in FIG. 24, a microsphere holder 100 according to the present disclosure may be made by a method 1000. The method includes at least a step 1100 of bending a microsphere holder to firmly clasp a microsphere. Additionally, the method further includes a step 1200 of creating a notch in the microsphere holder. Preferably, the bending creates a spring or elastic configuration such that the holder itself can serve as a damper. This comes in useful when the holder unintentionally comes into contact with the sample. That is, the holder acts like a leaf spring, absorbing the impact, thereby ensuring that the microsphere does not get knocked out of its receiving position. In other words, the assembly is robust enough for applications outside the carefully controlled environs of a laboratory. Optionally, an adhesive may be applied and cured. Even without the addition of the adhesive, the clamping force of the microsphere holder on the microsphere is sufficient to provide a robust assembly.

To facilitate effective clasping of the microsphere in position, the isosceles opening can be cut out by precision machining or precision laser cutting, and the surface roughness tolerance is preferably 1 μm. Bending of the metallic thin sheet can be done by means including mechanical bending or laser bending.

The holder as described above provides a strong enough clasping force to retain the microsphere in the slot, particularly to resist external forces generally directed along the optical axis 169 or the first axis 170. Prototypes have demonstrated that the microsphere holder can reduce the number of times the microsphere becomes decoupled from the microscope. Nevertheless, if it is so desired, the holder is also configured to provide easy access for the application of an adhesive where the microsphere contacts the holder. One way this can be done is to apply ultraviolet-curable adhesive at the two or more contacting points between the microsphere and the holder, and then to cure the adhesive under ultraviolet illumination. This fixing scheme was tested to verify its capability to hold the microsphere in position. Such tests include dropping the microsphere-installed adapter from a 1.5-metre height from the ground. The tests also include submerging the assembly in water and subjecting it to sonication for 1 minute using a 30 W sonicator. The microsphere holder in assembly with the microsphere passed both the described tests, proving its improved reliability and robustness.

Figure 25:
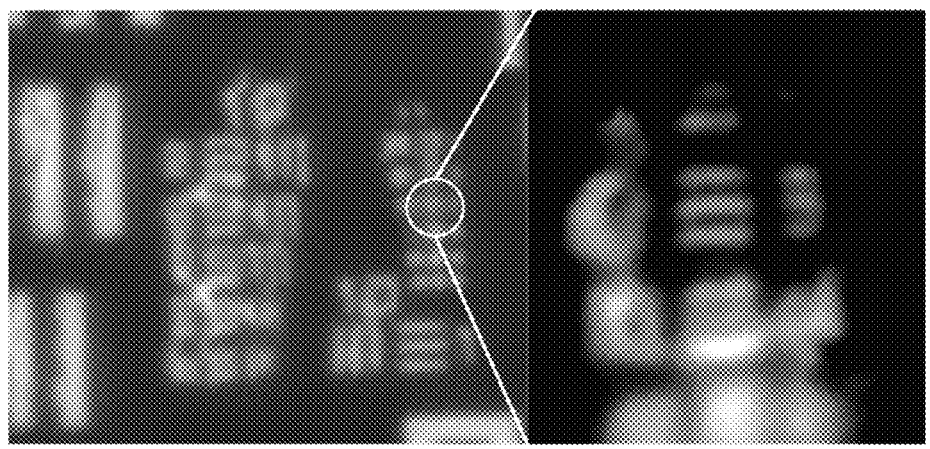
FIG. 25 is an image captured by an optical microsphere nanoscope according to an embodiment of the present disclosure.

After installing the microsphere onto the microsphere holder, it is used for imaging and the result obtained is presented in FIG. 25. As a non-limiting example, a reflection mode microscope mounted with an objective is used for the imaging experiment, and the imaging target is Newport HIGHRES-1 target. Visible or white light from light emitting diodes (LED) is adopted as the illumination source. The left image shows the imaging result directly under the objective lens, the best imaging result is shown by the fourth line in region 10, corresponding to a bar width of 345 nm and a periodicity of 690 nm. On the right, a zoomed-in image obtained by viewing through the microsphere is presented, the zoomed-in image corresponding to the area encircled in white in the left image. As an example, an imaging result using the microsphere-microsphere holder of the present disclosure shows the third line in region 11, which implies a bar width of 194 nm, and a periodicity of 388 nm. This shows a 1.78 times in the improvement of resolution using the microsphere holder. In other examples, the improvement of resolution under the microsphere holder may be up to 4 times.

The present application discloses embodiments of microsphere holder with high reliability, allowing enough illumination, being easy to operate, and being flexible for various types of samples. The microsphere holder allows sufficient illumination which positively affects imaging quality. The holder is also robust and has the flexibility to adapt to microspheres of different sizes.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. A holder for a microsphere, the holder comprising:
a first body portion and
a second body portion coupled to the first body portion, the first body portion and the second body portion being configured to provide a receiving position therebetween for the microsphere, such that when the microsphere is at the receiving position, the microsphere is coupled to the first body portion and the second body portion,
wherein the first body portion and the second body portion are configured to provide a plurality of selectable positions such that the receiving position is one selected from any of the plurality of selectable positions.

2. The holder as recited in claim 1, wherein the microsphere is coupled to the first body portion at a first coupling portion and the microsphere is coupled to the second body portion at a second coupling portion, and wherein the first coupling portion is distinct from the second coupling portion.

3. The holder as recited in claim 2, wherein the first body portion and the second body portion are configured to at least clasp the microsphere at the receiving position.

4. The holder as recited in claim 1, wherein the first body portion and the second body portion are spaced apart to define respective sides of a slot, the slot substantially extending along a first axis, and wherein the plurality of selectable positions is distributed along the first axis.

5. The holder as recited in claim 4, wherein the first body portion and the second body portion are spaced apart by a spacing, the spacing having at least two different widths along the first axis.

6. The holder as recited in claim 4, wherein the first body portion and the second body portion are non-parallel relative to one another.

7. The holder as recited in claim 1, wherein the first body portion defines a first distal surface substantially in a first plane, and the second body portion defines a second distal surface substantially in a second plane, and wherein the first plane and the second plane are non-coplanar.

8. The holder as recited in claim 7, wherein the first distal surface and the second distal surface define a reflex angle therebetween.

9. A lens system for near-field optics, the lens system comprising:
an objective lens;
a holder coupled to the objective lens, the holder having a first body portion and a second body portion configured to provide a receiving position; and
a microsphere at the receiving position, the microsphere being coupled to the first body portion and the second portion,
wherein the first body portion and the second body portion are configured to provide a plurality of selectable positions such that the receiving position is one selected from any of the plurality of selectable positions.

10. The lens system as recited in claim 9, wherein the microsphere is coupled to the first body portion at a first coupling portion and the microsphere is coupled to the second body portion at a second coupling portion, and wherein the first coupling portion is distinct from the second coupling portion.

11. The lens system as recited in claim 10, wherein the first body portion and the second body portion are configured to at least clasp the microsphere.

12. The lens system as recited in claim 10, wherein the first body portion defines a first distal surface substantially in a first plane, and the second body portion defines a second distal surface substantially in a second plane, and wherein the first plane and the second plane are non-coplanar.

13. The lens system as recited in claim 12, wherein the first distal surface and the second distal surface define a reflex angle therebetween.

14. The lens system as recited in claim 12, wherein the holder has reflection symmetry about a center plane, the center plane being defined by a center of the microsphere and an intersection line, the intersection line being an intersect of the first plane and the second plane.

15. A microsphere assembly, the microsphere assembly being attachable to an objective lens for near field optics, the microsphere assembly made by a process comprising:
bending a sheet from a first state to a second state, the sheet having a first body portion and a second body portion spaced apart to define respective coupling sides of a slot, the slot providing a receiving position for receiving a microsphere such that the microsphere is couplable to the first body portion and the second body portion at the respective coupling sides, wherein the bending makes the first body portion and the second body portion non co-planar relative to one another, wherein the first body portion and the second body portion are configured to provide a plurality of selectable positions such that the receiving position is one selected from any of the plurality of selectable positions.

16. The microsphere assembly made by the process as recited in claim 15, wherein the sheet in the second state is configured to clasp the microsphere between the respective coupling sides.

17. The microsphere assembly made by the process as recited in claim 16, wherein the coupling sides are non-parallel relative to one another when the sheet is in the second state, and wherein the coupling sides are substantially parallel to one another when the sheet is in the first state.

18. The microsphere assembly made by the process as recited in claim 16, wherein the microsphere is further fixed to the respective coupling sides by an adhesive.

\* \* \* \* \*